(12) United States Patent
Gupta et al.

(10) Patent No.: US 10,754,775 B2
(45) Date of Patent: Aug. 25, 2020

(54) FAST CACHE INVALIDATION RESPONSE USING CACHE CLASS ATTRIBUTES

(71) Applicant: NVIDIA Corp.

(72) Inventors: Jay Gupta, Bangalore (IN); Gosagan Padmanabhan, Bangalore (IN); Devesh Mittal, Bangalore (IN); Kaushal Agarwal, Bangalore (IN)

(73) Assignee: NVIDIA Corporation, Santa Clara, CA (US)

(*) Notice: Subject to any disclaimer, the term of this patent is extended or adjusted under 35 U.S.C. 154(b) by 81 days.

(21) Appl. No.: 16/222,696

(22) Filed: Dec. 17, 2018

(65) Prior Publication Data

US 2020/0174932 A1    Jun. 4, 2020

Related U.S. Application Data

(60) Provisional application No. 62/774,008, filed on Nov. 30, 2018.

(51) Int. Cl.
*G06F 12/0808* (2016.01)
*G06F 12/1045* (2016.01)

(52) U.S. Cl.
CPC ...... *G06F 12/0808* (2013.01); *G06F 12/1045* (2013.01); *G06F 2212/1044* (2013.01); *G06F 2212/683* (2013.01)

(58) Field of Classification Search
CPC .......................... G06F 12/0808; G06F 12/1045
USPC ........................................................ 711/141
See application file for complete search history.

(56) References Cited

U.S. PATENT DOCUMENTS

| 6,715,038 | B1* | 3/2004 | Nguyen | G06F 12/08 |
| | | | | 711/125 |
| 2010/0306476 | A1* | 12/2010 | Giri | G06F 11/2226 |
| | | | | 711/125 |
| 2014/0115210 | A1* | 4/2014 | Chirca | G06F 12/0815 |
| | | | | 710/110 |

* cited by examiner

*Primary Examiner* — Jae U Yu
(74) *Attorney, Agent, or Firm* — Artegis Law Group, LLP (57) ABSTRACT

A memory management unit responds to an invalidate by class command by identifying a marker for a class of cache entries that the invalidate by class command is meant to invalidate. The memory management unit stores the active marker as a retired marker and then sets the active marker to the next available marker. Thereafter, the memory management sends an acknowledgement signal (e.g., to the operating system) while invalidating the cache entries having the class and the retired marker in the background. By correlating markers with classes of cache entries, the memory management can more quickly respond to class invalidation requests.

20 Claims, 6 Drawing Sheets

FAST CACHE INVALIDATION RESPONSE USING CACHE CLASS ATTRIBUTES

CROSS REFERENCE TO RELATED APPLICATIONS

This application claims the benefit of U.S. provisional patent application Ser. No. 62/774,008, filed on Nov. 30, 2018, the contents of which are incorporated herein by reference in their entirety.

BACKGROUND

A memory management unit (MMU) is a device that performs the translation of virtual memory addresses to physical addresses (address translations). The memory management unit may be implemented as part of a processor device such as a central processing unit (CPU) or graphics processing unit (GPU), but it also can be implemented as separate integrated circuit from the processor. A memory management unit may partition the virtual address space (the range of addresses used by the processor) into pages. Some portion of the virtual address (e.g., the least significant bits) may be the same bits used in the corresponding physical address. This portion of the virtual address is referred to as the offset. Other bits of the virtual address (e.g., the most significant bits) may select the page.

A memory management unit may utilize a structure called a page table, comprising one page table entry (PTE) per page, to map virtual page addresses to physical page addresses in memory. An associative cache of PTEs is called a translation look-aside buffer (TLB). The TLB stores recent translations of virtual addresses to physical addresses and may be thought of as an address-translation cache. The physical page address from the TLB, corresponding to the virtual page address from the processor, is combined with the offset bits to form the complete physical address corresponding to the virtual address. Page tables may be organized as a hierarchical structure or as a flat structure. In the case of a hierarchical structure, intermediate levels may also be cached.

Invalidation is a process by which entries in various caches are marked for replacement or removal. In content addressable caches where cache entries are tagged with a class value, it may take a long time to look up and invalidate each cache entry for the class when the class as a whole is invalidated. In conventional approaches to cache class invalidation, the process issuing the invalidate by class command to the MMU waits for the MMU to provide an acknowledgement signal indicating completion of the invalidation. The cache may be unavailable to other processes executing in the system during this waiting time, degrading the system's performance. Herein, cache refers to various types of cache memory, including instruction, data, and address (e.g., TLB) caches.

By way of example, every process in an operating system (OS) may have a context ID associated with it. The context ID for a process may be used as a class for cache entries for the process. There are circumstances in which the OS will invalidate the entire context for a process. This involves among other things removing all the page table entries for the process and sending an invalidate by class command to the memory management unit to invalidate all of the cache entries for the process that are cached in one or more translation look-aside buffers.

When the OS invalidates the context of a process, it sends the invalidate by class command to trigger the memory management unit to perform the invalidation of cache entries tagged with the class for the context. The OS may then wait for an acknowledgement signal from the memory management unit indicating that the invalidation of the context for the process has completed.

In response to the invalidate by class command from the OS to invalidate the context for a process, the memory management unit looks up all the cache entries for the process in the respective translation look-aside buffers and MMU caches, invalidates those cache entries, and sends the acknowledgement signal to the OS indicating that the invalidation was completed. The cache entries for the process are the ones tagged with the class corresponding to the process.

The memory management unit attempts to balance the execution of invalidate by class commands with the continued performance of address translations for active contexts so that the impact on the performance of the system overall remains at acceptable levels.

After sending the invalidate by class command, the OS typically executes a polling loop while waiting for the acknowledgement signal from the memory management unit. Thus an OS is effectively blocked from further execution until the memory management unit completes the invalidation of all of the cache entries for the context.

The polling loop consumes central processing unit (CPU) cycles and hampers performance, especially when the CPU is also busy executing other tasks. The real-time responsiveness of the OS may also be hampered in scenarios in which the invalidate by class command is invoked from an interrupt service routine.

Existing solutions utilize scheduling algorithms to decrease the latency of responding to an invalidate by class command, but the latency still depends on the state of the active address translations under way for contexts other than the one being invalidated.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Disclosed herein are techniques to address the limitations of conventional approaches and reduce the time for the memory management unit to respond to an invalidate by class command. A substantially immediate acknowledgement signal is provided from the memory management unit to the OS in response to an invalidate by class command in most cases, provided that a value N (described below) is properly set. Acknowledgement signal refers to a signal generated in response to a command, indicating that processing of the command has completed.

When there is a burst of address translations for classes other than a class for which an invalidate by class command has been received, the memory management unit may prioritize performance of the address translations over executing the invalidation of the cache entries having the invalidated class, which will improve the overall system performance. Address translations refers to translations from virtual addresses to physical addresses.

The OS will receive the acknowledgement signal almost immediately in response to the invalidate by class command, which will free up CPU resources for handling other tasks. Immediately in this sense means to respond to the command before substantially completing (or in some cases, before even starting) the processing that the command is intended to invoke.

Another consequence of these techniques is to significantly reduce the memory management unit lookups required to execute the invalidate by class command in many circumstances.

Figure 1:
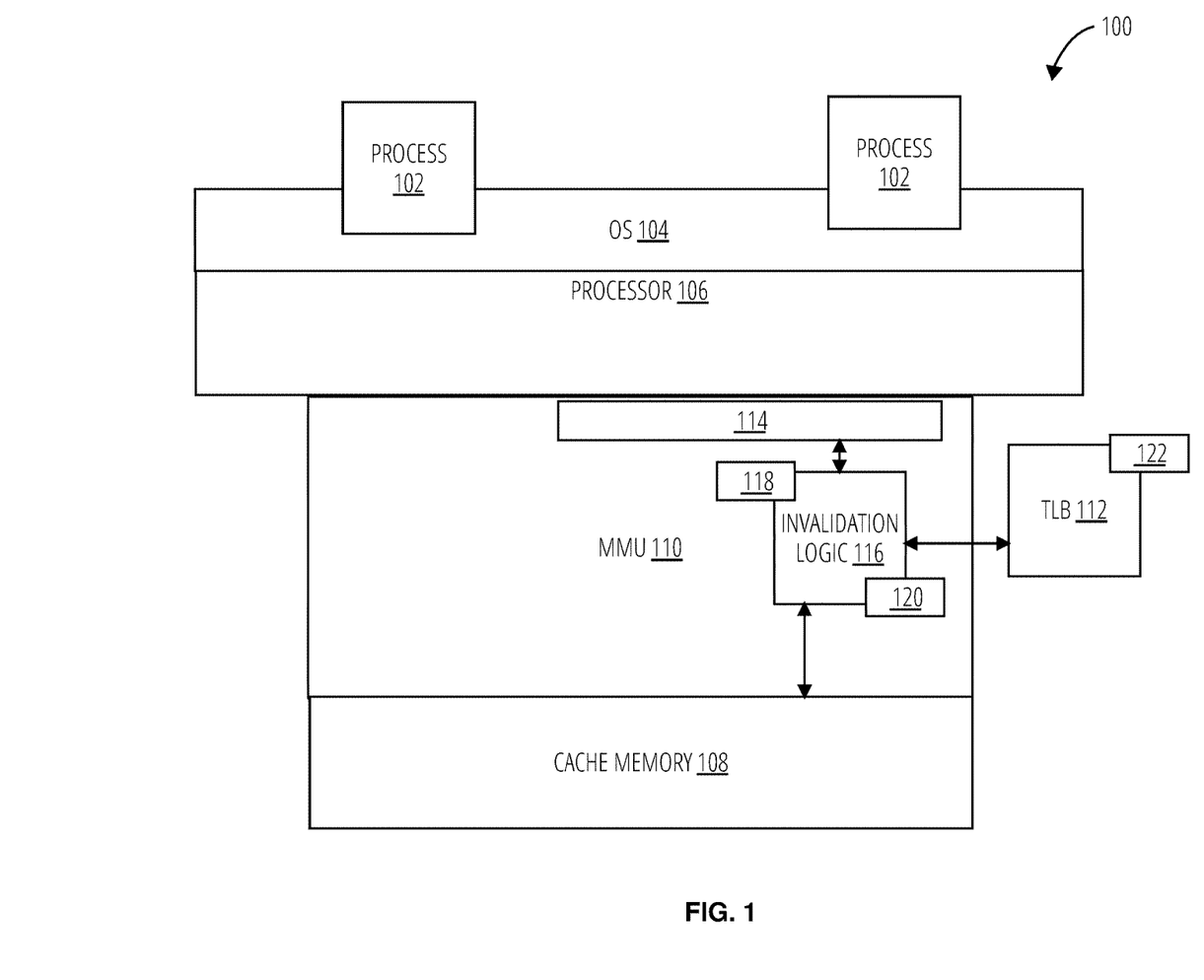
FIG. 1 illustrates a system 100 in accordance with one embodiment.

FIG. 1 illustrates a system 100 in accordance with one embodiment. The system 100 comprises various processes 102 that use or are within a device operating system 104, which executes on a processor 106 of the device (e.g., a central processing unit or graphics processing unit). The system 100 utilizes a cache memory 108 to speed up accesses to instructions and data utilized by the processor 106 during execution of the processes 102 and/or operating system 104. The cache memory 108 comprises a plurality of cache entries, e.g. cache entries 300.

A memory management unit 110 utilizes one or more translation look-aside buffer 112 to provide address translations between the virtual address space of the processes 102 and processor 106, and the addresses in the cache memory 108 or a slower physical memory (not shown). The translation look-aside buffer 112 typically comprises page table entries 122.

The memory management unit 110 comprises cache memory invalidation logic 116 to invalidate address locations in the cache memory 108 and the translation look-aside buffer 112. The cache memory invalidation logic 116 communicates with the processor 106 and/or the processes 102 via an asynchronous command interface 114, as further detailed herein. Asynchronous command interface refers to an interface between two components of a device that is operable for communicating asynchronous responses to commands between the components.

The cache memory invalidation logic 116 may comprise prioritization logic 118 and one or more state machine 120, which are further described below.

Although illustrated separately, in some embodiments one or more of the memory management unit 110, translation look-aside buffer 112, and/or cache memory 108 may be included in the processor 106.

Figure 2:
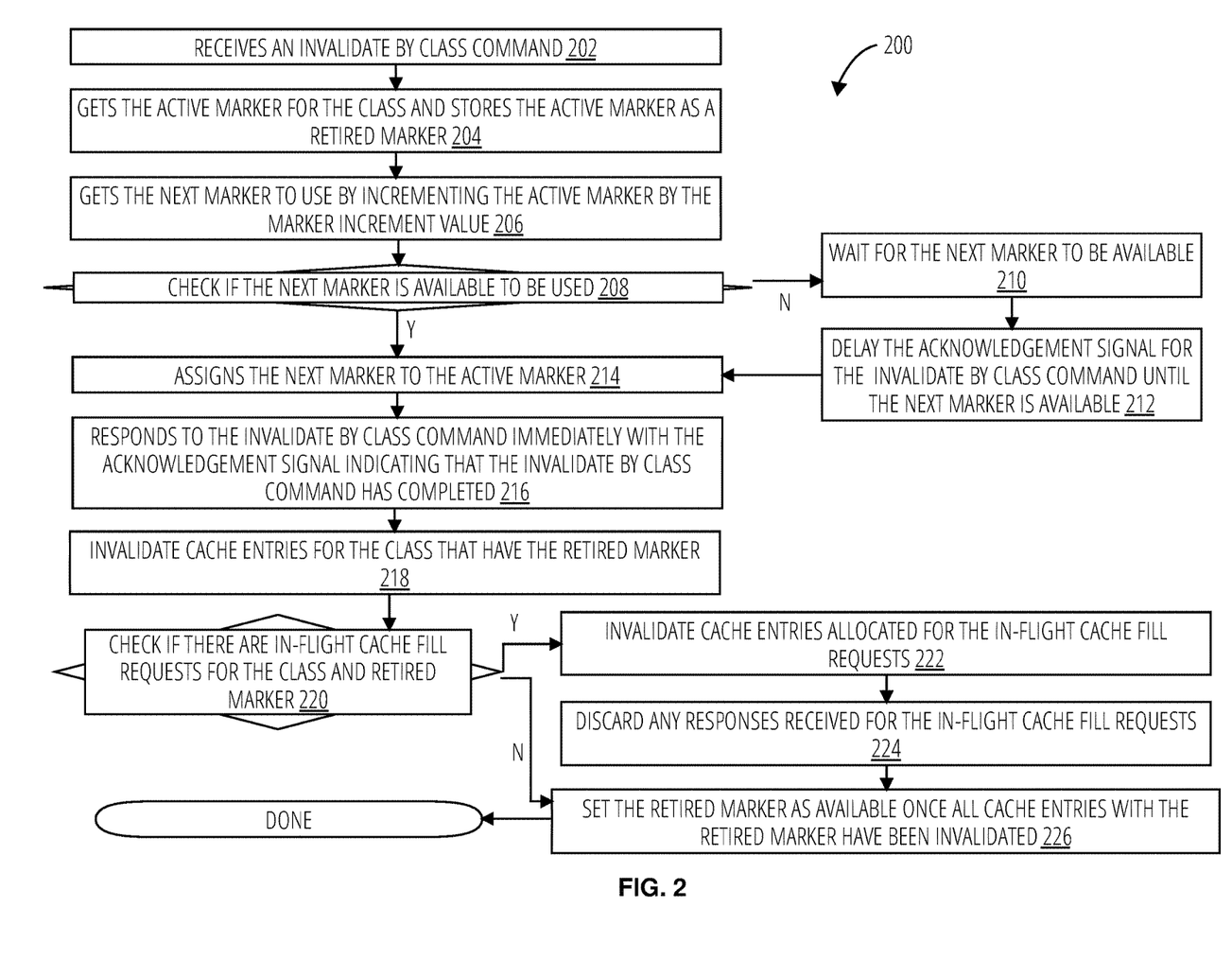
FIG. 2 illustrates a memory management process 200 in accordance with one embodiment.

FIG. 2 illustrates an embodiment of a memory management process 200, which may be implemented in one embodiment using one or more state machine 120. In step 202, the memory management process 200 receives an invalidate by class command identifying the class to invalidate. In step 204, process 200 gets the active marker for the class and stores the active marker as a retired marker. A marker refers to a specific metadata value applied to cache entries for a class, where metadata is data stored in association with cache data contents. In one embodiment, a marker comprises N-bits, where N is an integer. In some embodiments, N is determined (derived) by runtime profiling of use of the invalidate by class command by a device operating system. Higher usage frequency would be indicative of a need for a larger N.

A class refers to a context identifier, and active contexts refers to virtual address space allocations that are in use and valid. An available marker refers to a marker that is not the active marker nor a marker in the process of being invalidated.

In step 206, the memory management process 200 tentatively selects the next marker to use as the active marker. In one embodiment, the next marker is obtained by incrementing the active marker by a predetermined increment value. In step 208, process 200 performs a check if the next marker is available to be used. If not, in step 210, the memory management process 200 will wait for the next marker to be available and in step 212, delay the acknowledgement signal for the invalidate by class command until the next marker is available.

If the next marker is available for use (is an available marker), the memory management process 200 in step 214 designates the next marker as the active marker and in step 216, responds to the invalidate by class command immediately with the acknowledgement signal indicating that the invalidate by class command has completed. In step 218, the memory management process 200 will also invalidate cache entries for the class that have the retired marker and in step 220, check if there are in-flight cache fill requests for the class and retired marker. In-flight cache fill requests are requests for data by a processor that have been initiated but not yet completed (e.g., initiated but not yet resolved address translations underway when an invalidate by class command is received by a memory management unit). In step 222, if there are such requests, the memory management process 200 will invalidate cache entries allocated for the in-flight cache fill requests and in step 224, discard any responses received for the in-flight cache fill requests.

In step 226, the memory management process 200 will set the retired marker as available once all cache entries with the retired marker have been invalidated.

Figure 3:
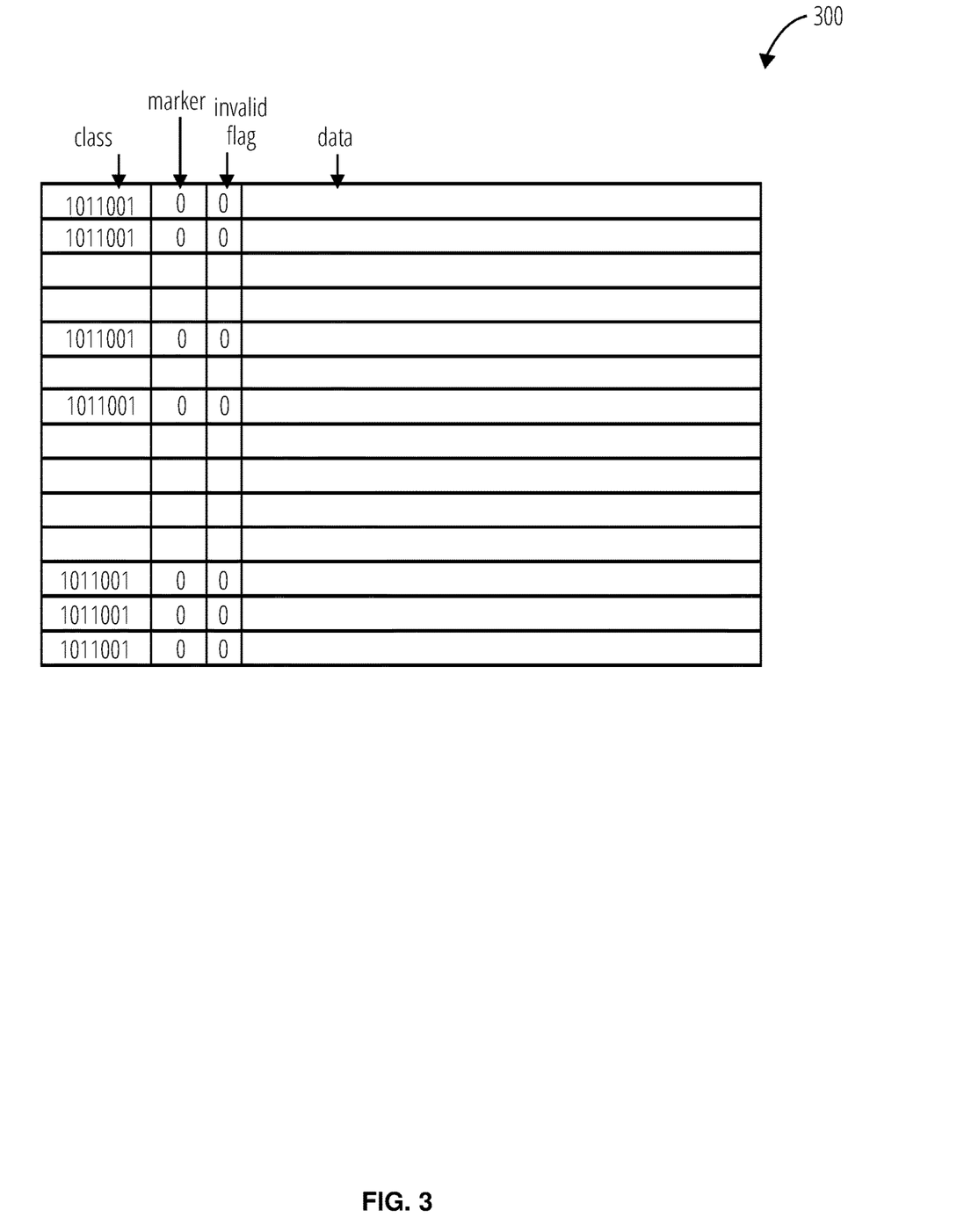
FIG. 3 illustrates cache entries 300 during execution of a first process in accordance with one embodiment.

FIG. 3 through FIG. 6 illustrate the evolution of cache entries 300 in accordance with one embodiment of a cache management process 600. At block 602 the operating system 104 starts a first process. This process, and the second and third process that follow, are part of a common address space for a virtual machine or other virtual address space partition. At block 604 the memory management unit 110 begins populating the cache memory 108 with cache entries based on physical memory accesses by the first process. These cache entries are tagged with a class identifier for the virtual machine, and with the active marker for that class, which is 0 in this example. This is shown in FIG. 3.

Figure 6:
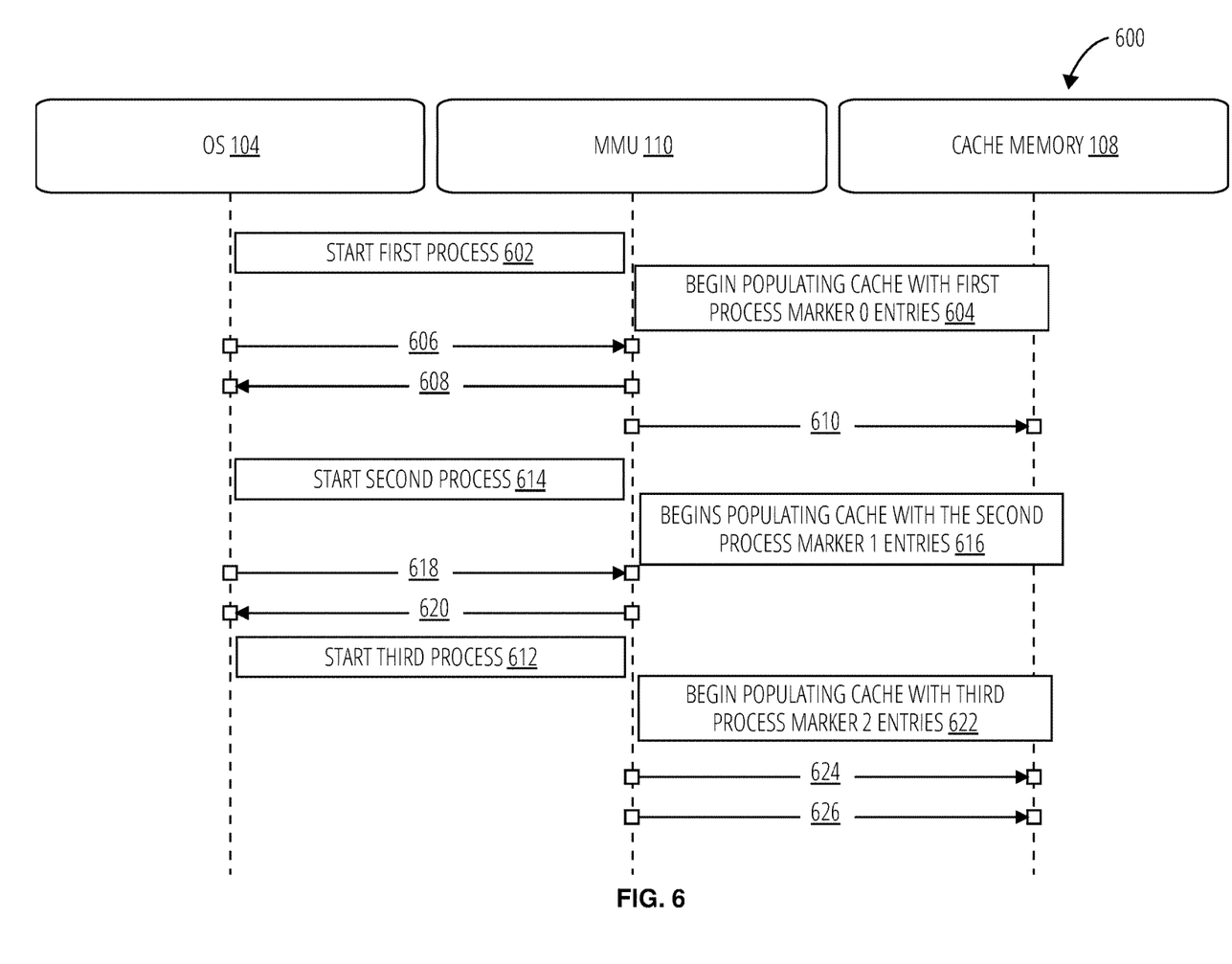
FIG. 6 illustrates a cache management process 600 in accordance with one embodiment.

After executing the first process for some amount of time, the operating system 104 concludes the first process and sends an invalidate by class command for the first process 606 to the memory management unit 110 to reclaim the cache entries for the first process. The memory management unit 110 returns an acknowledge signal 608 to the operating system 104 immediately and begins invalidating the first process marker 0 entries 610 in a "lazy" fashion, e.g., in the background while the operating system 104 continues on as though the invalidate by class command for the first process 606 has completed, and giving priority to address translations by other processes (e.g. as implemented by prioritization logic 118). The memory management unit 110 also increments the active marker to 1. At block 614 the operating system 104 starts a second process and may use virtual addresses that were previously used by the first process, since from the perspective of the operating system 104 those virtual addresses are now available for reuse.

Figure 4:
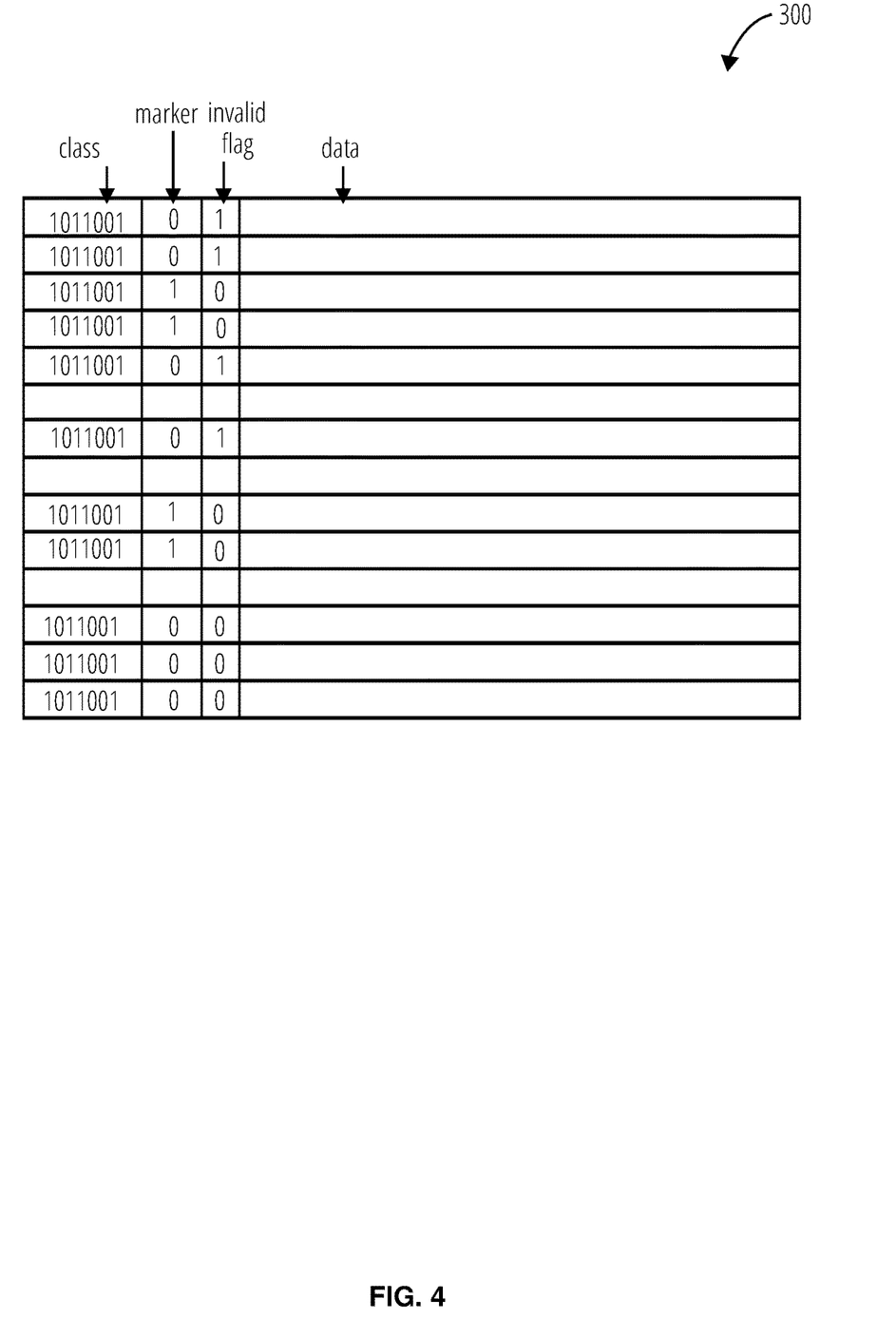
FIG. 4 illustrates cache entries 300 after invalidation of the first process and starting of a second process, in accordance with one embodiment.

At block 616 memory management unit 110 then begins populating the cache with cache entries for the second process, tagging them with the same class but with the new active marker 1, as shown in FIG. 4. The memory management unit 110 continues to invalidate entries for the class having marker 0 while this goes on, giving priority to address translations for the second process.

After executing the second process for some time, the operating system 104 sends an invalidate by class command for the second process 618 to the memory management unit 110. Again the memory management unit 110 responds immediately with an acknowledge signal 620 to the operating system 104, and the operating system 104 continues as though the virtual addresses for the first process and the second process are all available for use by other processes. At block 612 the operating system 104 starts a third process.

Figure 5:
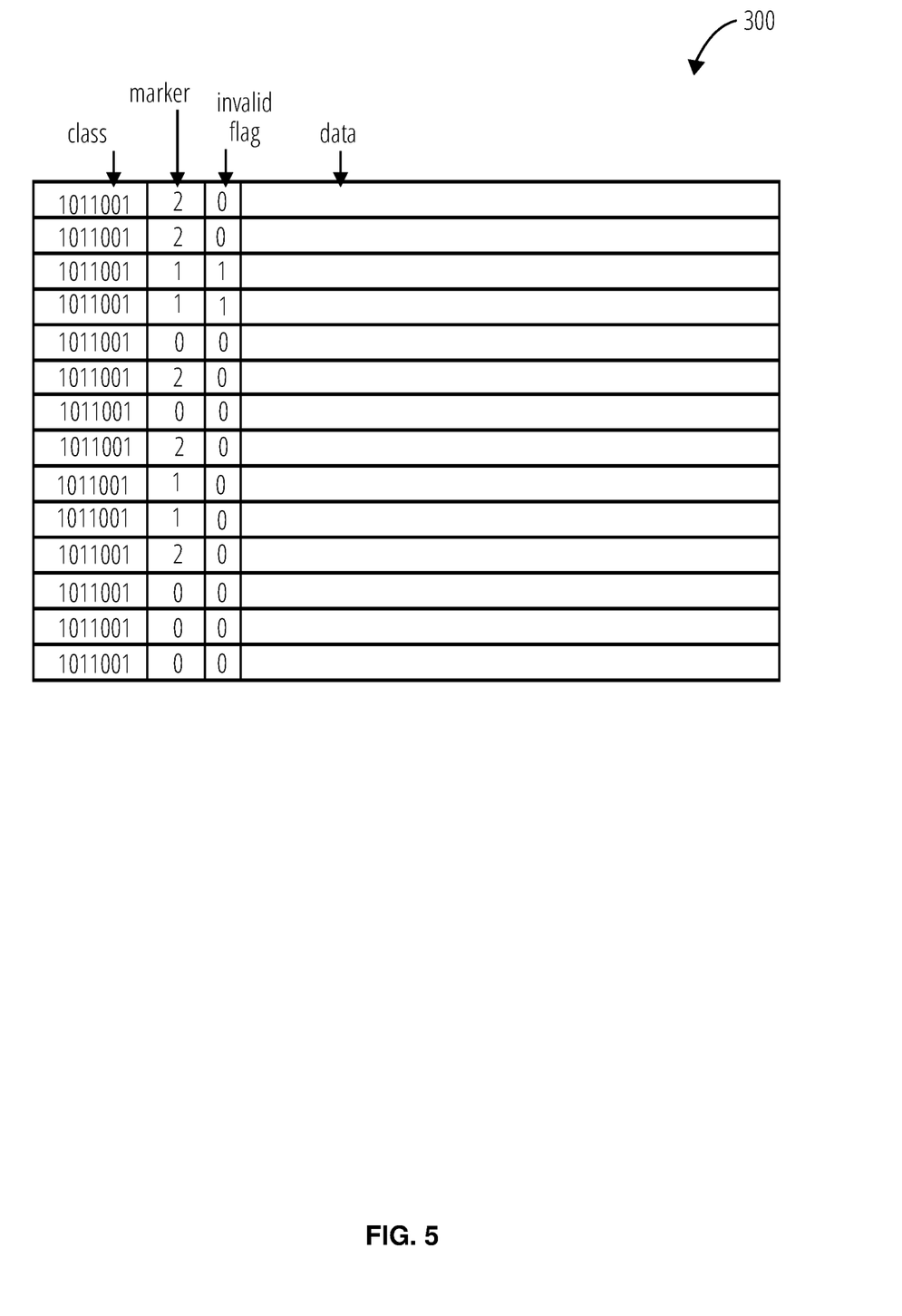
FIG. 5 illustrates cache entries 300 after invalidation of the second process and starting of a third process, in accordance with one embodiment.

At this point, as shown in FIG. 5, the memory management unit 110 at block 622 begins populating the cache memory 108 with cache entries for the third process having marker 2. The memory management unit 110 also begins invalidating the second process marker 1 entries 624. The memory management unit 110 actuality completes the invalidate by class command for the first process 606 by completing the invalidation of the first process marker 0 entries 626. There is no need for the memory management unit 110 to signal the operating system 104 of this actual completion, because the operating system 104 is already operating as though the invalidate by class command for the first process 606 was completed. The cache entries for the class having marker 0 may now be reused as cache entries for the class having marker 2.

Circuitry refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment). Firmware refers to software logic embodied as processor-executable instructions stored in read-only memories or media, "hardware" refers to logic embodied as analog or digital circuitry, and "logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Software refers to logic implemented as processor-executable instructions in a machine memory (e.g. read/write volatile or nonvolatile memory or media). The disclosed apparatuses and techniques may be implemented using hardware, software, and firmware, or combinations thereof, according to the requirements of the particular implementation.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator." Likewise, switching may be carried out by a "switch", selection by a "selector", and so on.

What is claimed is:

1. A memory management unit comprising:
an asynchronous command interface;
cache memory invalidation logic adapted to:
identify an active marker for a class of cache entries;
set the active marker as a retired marker; and
on condition that a next marker is available to be used, operate the asynchronous command interface to immediately respond to an invalidate by class command for the class with an acknowledgement signal, and perform a background invalidation of the cache entries having the class and the retired marker.

2. The memory management unit of claim 1, the cache memory invalidation logic further adapted to:
determine the next marker by incrementing the active marker for the class of cache entries by an increment value;
on condition that the next marker is not available to be used, wait for the next marker to be available to be used before invalidating the cache entries having the class and the retired marker.

3. The memory management unit of claim 2, wherein the cache memory invalidation logic is further adapted to wait until the next marker is available to be used before operating the asynchronous command interface to send the acknowledgement signal.

4. The memory management unit of claim 2, wherein the increment value is one.

5. The memory management unit of claim 1, wherein the class corresponding to the invalidate by class command corresponds to page table entries in at least one translation look-aside buffer.

6. The memory management unit of claim 1, further comprising prioritization logic to prioritize address translations for active contexts over execution of the invalidate by class command.

7. The memory management unit of claim 1, the cache memory invalidation logic further adapted to:
   invalidate cache entries allocated for in-flight cache fill requests for cache entries having the retired marker; and
   discard responses received for the in-flight cache fill requests.

8. A memory management unit comprising:
   an asynchronous command interface to receive and an invalidate by class command from an operating system and operable to respond to the invalidate by class command with an asynchronous acknowledgement signal;
   cache memory invalidation logic coupled to the asynchronous command interface and responsive to the invalidate by class command, the cache memory invalidation logic adapted to:
      identify an active marker for a class of cache entries identified with the invalidate by class command;
      set the active marker as a retired marker;
      determine a next marker by incrementing the active marker for the class by an increment value;
      on condition that the next marker is available to be used:
         set the active marker to the next marker;
         operate the asynchronous command interface to send the acknowledgement signal; and
         invalidate the cache entries having the class and the retired marker.

9. The memory management unit of claim 8, the cache memory invalidation logic further adapted to:
   on condition that the next marker is not available to be used:
   wait for the next marker to be available to be used before invalidating the cache entries having the class and the retired marker; and
   wait until the next marker is available to be used before causing the asynchronous command interface to send the acknowledgement signal.

10. The memory management unit of claim 8, wherein the increment value is one.

11. The memory management unit of claim 8, wherein the class corresponding to the invalidate by class command corresponds to page table entries in at least one translation look-aside buffer.

12. The memory management unit of claim 8, further comprising prioritization logic to prioritize address translations for active contexts over execution of the invalidate by class command.

13. The memory management unit of claim 8, the cache memory invalidation logic further adapted to:
   invalidate cache entries allocated for in-flight cache fill requests for cache entries having the retired marker; and
   discard responses received for the in-flight cache fill requests.

14. The memory management unit of claim 8, wherein the cache memory invalidation logic is implemented using a state machine.

15. The memory management unit of claim 8, wherein the active marker comprises N-bits, where N is derived from runtime profiling of use of the invalidate by class command by the operating system.

16. A memory management unit comprising:
   a plurality of cache entries; and
   cache memory invalidation logic to assign an active marker to a class of the cache entries and operate an asynchronous command interface to immediately acknowledge an invalidate by class command for the class and the marker while performing a background invalidation of the cache entries having the class and a retired marker.

17. The memory management unit of claim 16, the cache memory invalidation logic to determine a next marker by incrementing a previous active marker for the class of cache entries by an increment value and to wait for the next marker to be available to be used before invalidating the cache entries having the class and the retired marker.

18. The memory management unit of claim 17, the cache memory invalidation logic to wait until the next marker is available to be used before acknowledging the invalidate by class command.

19. The memory management unit of claim 17, wherein the increment value is set to one.

20. The memory management unit of claim 16, wherein the class corresponding to the invalidate by class command corresponds to page table entries in at least one translation look-aside buffer.

* * * * *

UNITED STATES PATENT AND TRADEMARK OFFICE
CERTIFICATE OF CORRECTION

PATENT NO. : 10,754,775 B2
APPLICATION NO. : 16/222696
DATED : August 25, 2020
INVENTOR(S) : Jay Gupta et al.

Page 1 of 1

It is certified that error appears in the above-identified patent and that said Letters Patent is hereby corrected as shown below:

On the Title Page (71) Applicant:
Please delete "NVIDIA Corp." and insert --NVIDIA Corp., Santa Clara, CA (US)--.

Signed and Sealed this
Twentieth Day of October, 2020

Andrei Iancu
*Director of the United States Patent and Trademark Office*